(12) United States Patent
Min et al.

(10) Patent No.: US 7,135,807 B2
(45) Date of Patent: Nov. 14, 2006

(54) PIEZOELECTRIC ACTUATOR DRIVE SYSTEM

(75) Inventors: Byoung Own Min, Kyungki-do (KR); Hyoung Jun Jeon, Kyungki-do (KR); Hyun Jin Kim, Kyungki-do (JP)

(73) Assignee: Samsung Electro-Mechanics Co., Ltd., Kyungki-Do (KR)

( * ) Notice: Subject to any disclaimer, the term of this patent is extended or adjusted under 35 U.S.C. 154(b) by 14 days.

(21) Appl. No.: 10/994,459

(22) Filed: Nov. 23, 2004

(65) Prior Publication Data

US 2006/0061232 A1  Mar. 23, 2006

(30) Foreign Application Priority Data

Sep. 22, 2004  (KR) ............... 10-2004-0075848

(51) Int. Cl.
*H01L 41/09* (2006.01)
*H02N 2/06* (2006.01)
(52) U.S. Cl. .................... 310/317; 310/316.01
(58) Field of Classification Search ........ 310/317, 310/316.01
See application file for complete search history.

(56) References Cited

U.S. PATENT DOCUMENTS 5,410,206 A * 4/1995 Luecke et al. ............. 310/328

2005/0219719 A1* 10/2005 Kawai .................. 359/819
2005/0285476 A1* 12/2005 Chou et al. ............ 310/317

FOREIGN PATENT DOCUMENTS

JP  06-062585  3/1994
JP  2004-56951  2/2004

* cited by examiner

*Primary Examiner*—Darren Schuberg
*Assistant Examiner*—Derek Rosenau
(74) *Attorney, Agent, or Firm*—Lowe Hauptman & Berner, LLP.

(57) ABSTRACT

Disclosed herein is a piezoelectric actuator drive system for forward or backward driving a piezoelectric actuator for zooming and/or focusing in a camera module. The piezoelectric actuator drive system comprises a power supply for supplying an operating voltage, a drive controller for controlling generation of a forward/backward drive signal for a piezoelectric actuator in response to an operation ON select signal and a forward/backward driving select signal, a clock generator for generating a first clock signal in response to the operating voltage from the power supply, and a drive signal generator for generating and supplying the forward or backward drive signal to the piezoelectric actuator in response to the first clock signal from the clock generator and the operating voltage from the power supply under the forward/backward drive signal generation control of the drive controller.

11 Claims, 12 Drawing Sheets

(waveform generation starting point T1 or T2)

PIEZOELECTRIC ACTUATOR DRIVE SYSTEM

RELATED APPLICATIONS

The present application is based on, and claims priority from, Korean Application Number 2004-75848, filed Sep. 22, 2004, the disclosure of which is incorporated by reference herein in its entirety.

BACKGROUND OF THE INVENTION

1. Field of the Invention

The present invention relates to a system for driving a piezoelectric actuator which is applied to a camera module of a mobile phone or the like for focusing and/or zooming therein, and more particularly to a piezoelectric actuator drive system which is capable of driving a piezoelectric actuator for zooming and/or focusing in a camera module forward or backward using a phase shift of two drive waves forming a drive signal, and selectively driving two such piezoelectric actuators, thereby reducing power consumption and improving efficiency.

2. Description of the Related Art

Generally, piezoelectric actuators are transducers that convert electrical energy into a mechanical displacement or stress using a piezoelectric effect. These actuators may be, for example, a motor for zooming and focusing in a camera module of a mobile phone or the like, a cylinder, etc.

The piezoelectric actuators are driven in various manners according to the purposes and methods of use of systems to which they are applied.

Recently, such a piezoelectric actuator has been applied to a small-size camera module of a mobile phone or the like for zooming and focusing therein, resulting in a need for a drive system to drive the actuator.

FIG. 1 is a circuit diagram of a conventional piezoelectric actuator drive circuit, which is denoted by the reference numeral 2.

In the conventional piezoelectric actuator drive circuit 2 shown in FIG. 1, the reference numeral 20 denotes an initial storage unit which stores energy to drive a piezoelectric actuator 3. The initial storage unit 20 is implemented with an inductor. The reference numeral 4 denotes a voltage detector which detects a voltage across the piezoelectric actuator 3 at a predetermined time after transfer of the energy stored in the initial storage unit 20 to the actuator 3. The reference numeral 5 denotes a storage controller which compares the voltage detected by the voltage detector 4 with a voltage desired for the piezoelectric actuator 3 and, on the basis of a result of the comparison, controls the amount of energy to be stored in the initial storage unit 20 in the next driving period such that the voltage detected by the voltage detector 4 is equal to the desired voltage in the next driving period.

In FIG. 1, when a switch SW1 is turned on, energy is stored in a primary coil L1 of a transformer in the initial storage unit 20. If the switch SW1 is turned off after the lapse of a certain time, the energy stored in the initial storage unit 20 drives the piezoelectric actuator 3, which is a capacitive element, through a secondary coil L2 of the transformer and a diode D2, thereby causing a voltage Vp to be generated across the actuator 3 and then maintained at a constant level after the lapse of a predetermined time.

When a switch SW2 is turned on after the lapse of the predetermined time, the energy stored in the piezoelectric actuator 3 is discharged, so that the voltage Vp drops to 0. While the voltage Vp across the piezoelectric actuator 3 is maintained at the constant level, the voltage detector 4 detects the voltage Vp and the storage controller 5 compares the detected voltage Vp with a voltage Va desired for the piezoelectric actuator 3. The storage controller 5 then determines the amount of energy for the next driving period according to a result of the comparison and then whether to make the ON time of the switch SW1 in the circuit of FIG. 1 longer or shorter than that in the previous driving period. As a result, the desired voltage Va is rapidly applied to the piezoelectric actuator 3 by repeating the driving operation a minimum number of times.

In other words, by detecting a voltage across the piezoelectric actuator 3 which is driven at intervals of the predetermined time and determining the amount of energy to be stored in the next driving period, it is possible to maintain the voltage across the actuator 3 at a constant level and cope with capacitive variation of the actuator 3.

Details of such a piezoelectric actuator drive circuit are disclosed in Japanese Patent Laid-open Publication No. Heisei 06-62585.

However, the aforementioned conventional piezoelectric actuator drive circuit is disadvantageous in that it cannot be applied for forward or backward driving of the piezoelectric actuator and cannot selectively drive two such piezoelectric actuators.

SUMMARY OF THE INVENTION

Therefore, the present invention has been made in view of the above problem, and it is an object of the present invention to provide a piezoelectric actuator drive system which is capable of driving a piezoelectric actuator for zooming and/or focusing in a camera module forward or backward using a phase shift of two drive waves forming a drive signal, and selectively driving two such piezoelectric actuators, thereby reducing power consumption and improving efficiency.

In accordance with an aspect of the present invention, the above and other objects can be accomplished by the provision of a piezoelectric actuator drive system comprising: power supply means for supplying an operating voltage; drive control means for controlling generation of a forward/backward drive signal for a piezoelectric actuator in response to an operation ON select signal and a forward/backward driving select signal; clock generation means for generating a first clock signal in response to the operating voltage from the power supply means; and drive signal generation means for generating the forward or backward drive signal to supplying to the piezoelectric actuator in response to the first clock signal from the clock generation means and the operating voltage from the power supply means under the forward/backward drive signal generation control of the drive control means.

The drive control means may include: an operation controller for outputting an operation enable signal to the drive signal generation means in response to the operation ON select signal and the operating voltage from the power supply means; and a buffer for outputting a forward/backward select signal to the drive signal generation means in response to the forward/backward driving select signal.

In accordance with another aspect of the present invention, there is provided a piezoelectric actuator drive system comprising: power supply means for supplying an operating voltage; drive control means for controlling selection of one of first and second piezoelectric actuators and generation of a forward/backward drive signal for the selected piezoelectric actuator in response to an operation ON select signal, a piezoelectric actuator select signal and a forward/backward driving select signal; clock generation means for generating a first clock signal in response to the operating voltage from the power supply means; drive signal generation means for generating the forward or backward drive signal in response to the first clock signal from the clock generation means and the operating voltage from the power supply means under the forward/backward drive signal generation control of the drive control means; and a piezoelectric actuator selector for selecting one of the first and second piezoelectric actuators under the piezoelectric actuator selection control of the drive control means and supplying the forward or backward drive signal generated by the drive signal generation means to the selected piezoelectric actuator.

The drive control means may include: an operation controller for outputting an operation enable signal to the drive signal generation means in response to the operation ON select signal and the operating voltage from the power supply means; a switching controller for supplying a plurality of switching signals to the piezoelectric actuator selector in response to the piezoelectric actuator select signal and the operation enable signal from the operation controller to select one of the first and second piezoelectric actuators; and a buffer for outputting a forward/backward select signal to the drive signal generation means in response to the forward/backward driving select signal.

The drive signal generation means may include: a shift register including n flip-flops forming a ring structure, the flip-flops sequentially outputting high signals in response to the first clock signal from the clock generation means; a waveform generation controller for controlling the generation of the forward or backward drive signal using the sequential high signals from the shift register in response to the forward/backward select signal from the drive control means while the operation enable signal from the drive control means is inputted; and a drive waveform generator for generating the forward or backward drive signal using the operating voltage from the power supply means under the control of the waveform generation controller, the forward or backward drive signal generated by the drive waveform generator including first and second drive waves having a phase difference of about 90° therebetween.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
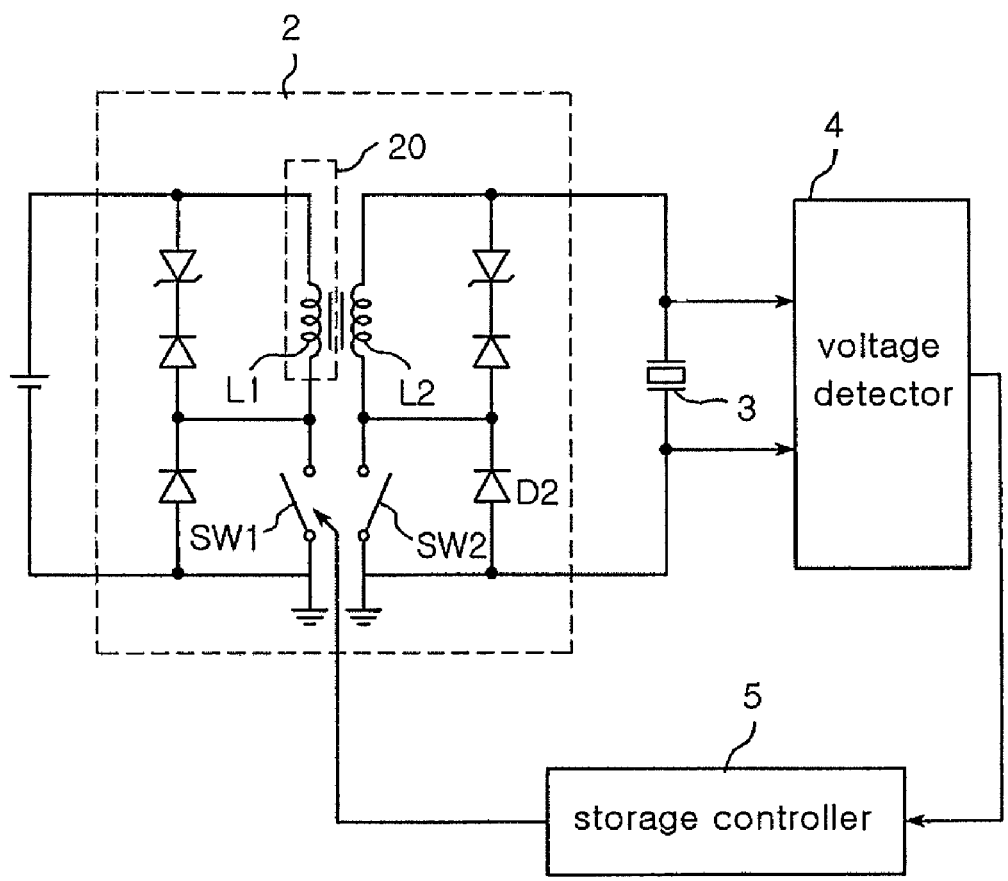
FIG. 1 is a circuit diagram of a conventional piezoelectric actuator drive circuit.

Now, preferred embodiments of the present invention will be described in detail with reference to the annexed drawings. In the drawings, the same or similar elements are denoted by the same reference numerals even though they are depicted in different drawings.

Figure 2:
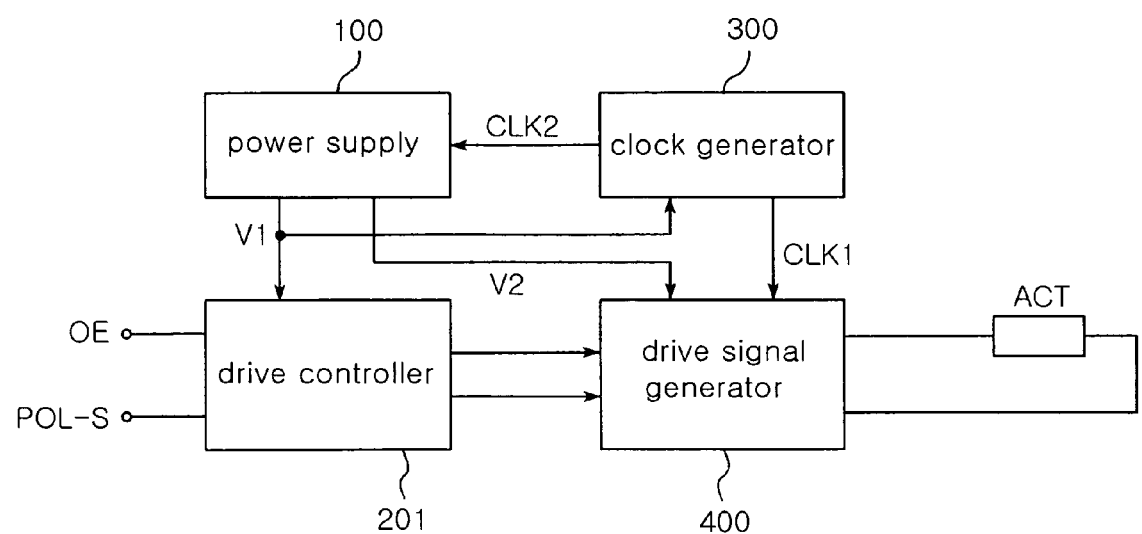
FIG. 2 is a block diagram showing the configuration of a piezoelectric actuator drive system according to a first embodiment of the present invention.

FIG. 2 is a block diagram showing the configuration of a piezoelectric actuator drive system according to a first embodiment of the present invention.

With reference to FIG. 2, the piezoelectric actuator drive system according to the first embodiment of the present invention comprises a power supply 100 for supplying operating voltages V1 and V2, a drive controller 201 for controlling generation of a forward/backward drive signal Sd for a piezoelectric actuator ACT in response to an operation ON select signal OE and a forward/backward driving select signal POL-S, a clock generator 300 for generating a first clock signal CLK1 in response to the operating voltage V1 from the power supply 100, and a drive signal generator 400 for generating the forward or backward drive signal Sd to supplying to the piezoelectric actuator ACT in response to the first clock signal CLK1 from the clock generator 300 and the operating voltage V2 from the power supply 100 under the forward/backward drive signal generation control of the drive controller 201.

Figure 3:
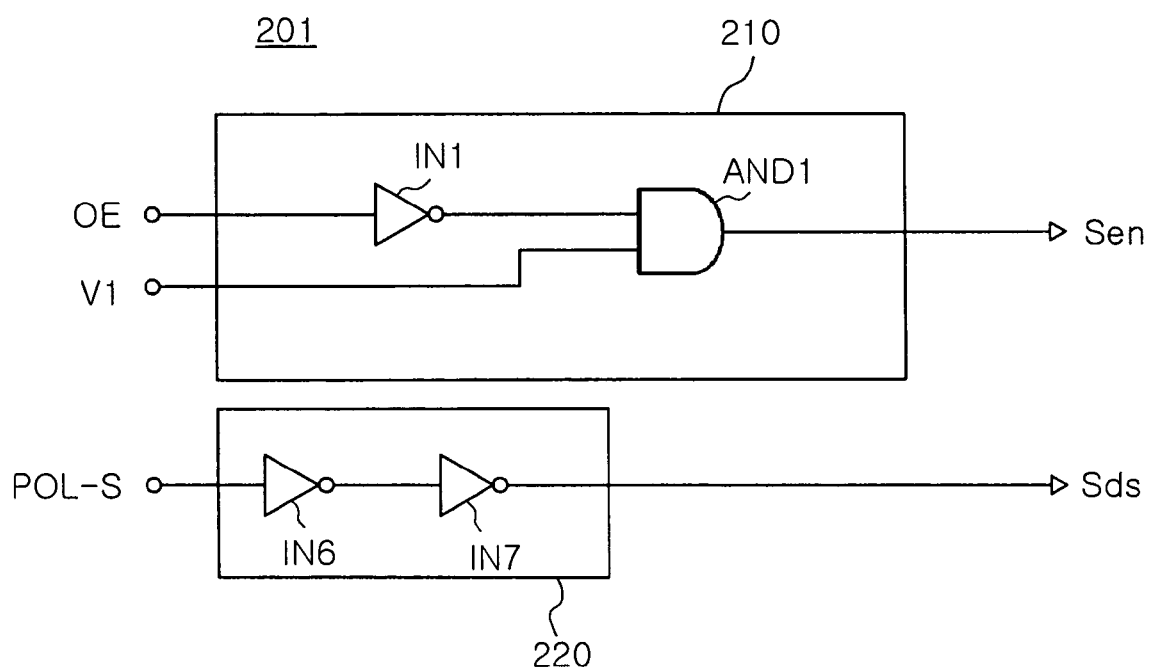
FIG. 3 is a circuit diagram of a drive controller in FIG. 2.

FIG. 3 is a circuit diagram of the drive controller 201 in FIG. 2.

With reference to FIG. 3, the drive controller 201 includes an operation controller 210 for outputting an operation enable signal Sen to the drive signal generator 400 in response to the operation ON select signal OE and the operating voltage V1 from the power supply 100, and a buffer 220 for outputting a forward/backward select signal Sds to the drive signal generator 400 in response to the forward/backward driving select signal POL-S.

Figure 4:
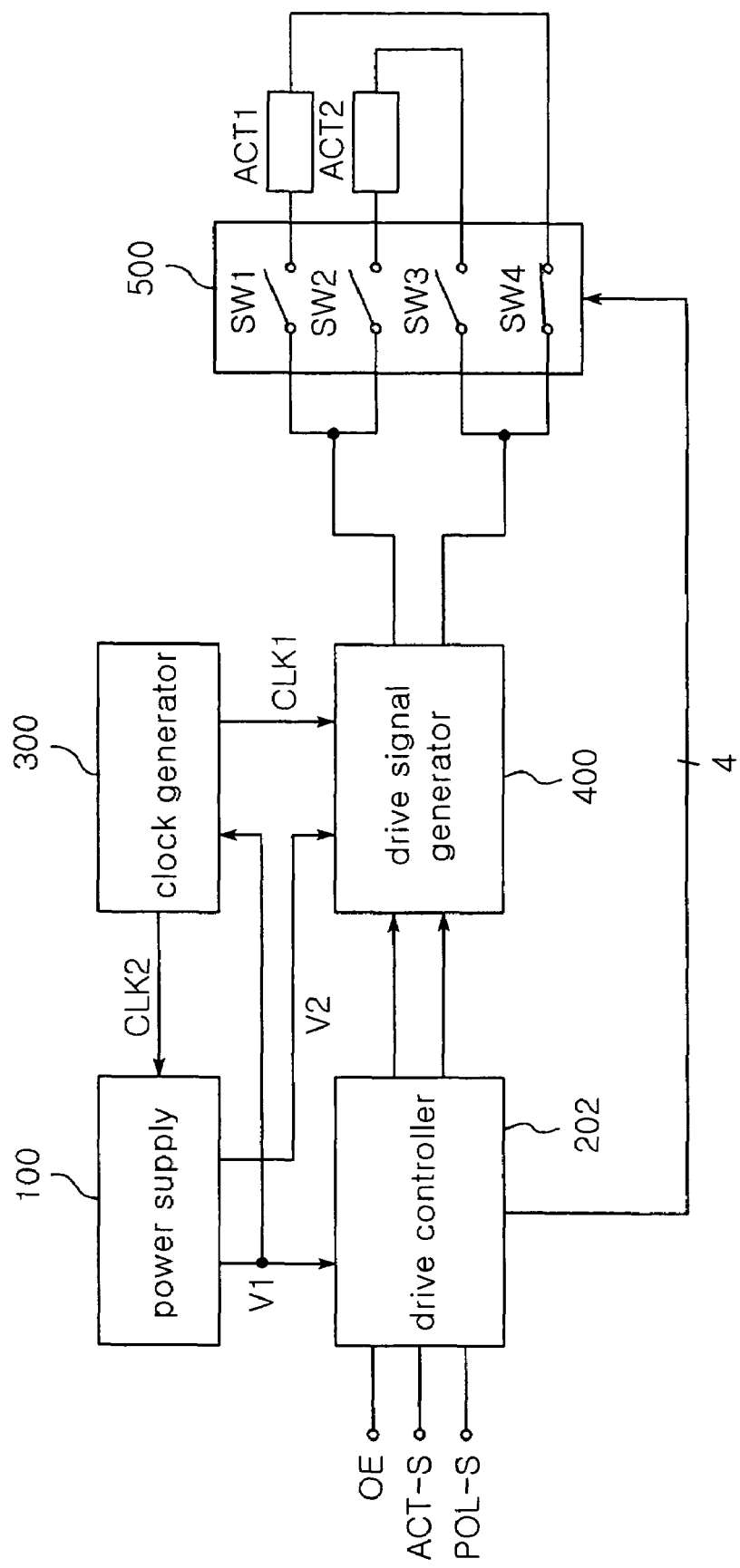
FIG. 4 is a block diagram showing the configuration of a piezoelectric actuator drive system according to a second embodiment of the present invention.

FIG. 4 is a block diagram showing the configuration of a piezoelectric actuator drive system according to a second embodiment of the present invention.

With reference to FIG. 4, the piezoelectric actuator drive system according to the second embodiment of the present invention comprises a power supply 100 for supplying operating voltages V1 and V2, a drive controller 202 for controlling selection of one of first and second piezoelectric actuators ACT1 and ACT2 and generation of a forward/backward drive signal Sd for the selected piezoelectric actuator in response to an operation ON select signal OE, a piezoelectric actuator select signal ACT-S and a forward/backward driving select signal POL-S, a clock generator 300 for generating a first clock signal CLK1 in response to the operating voltage V1 from the power supply 100, a drive signal generator 400 for generating the forward or backward drive signal Sd in response to the first clock signal CLK1 from the clock generator 300 and the operating voltage V2 from the power supply 100 under the forward/backward drive signal generation control of the drive controller 202, and a piezoelectric actuator selector 500 for selecting one of the first and second piezoelectric actuators ACT1 and ACT2 under the piezoelectric actuator selection control of the drive controller 202 and supplying the forward or backward drive signal Sd generated by the drive signal generator 400 to the selected piezoelectric actuator.

Figure 5:
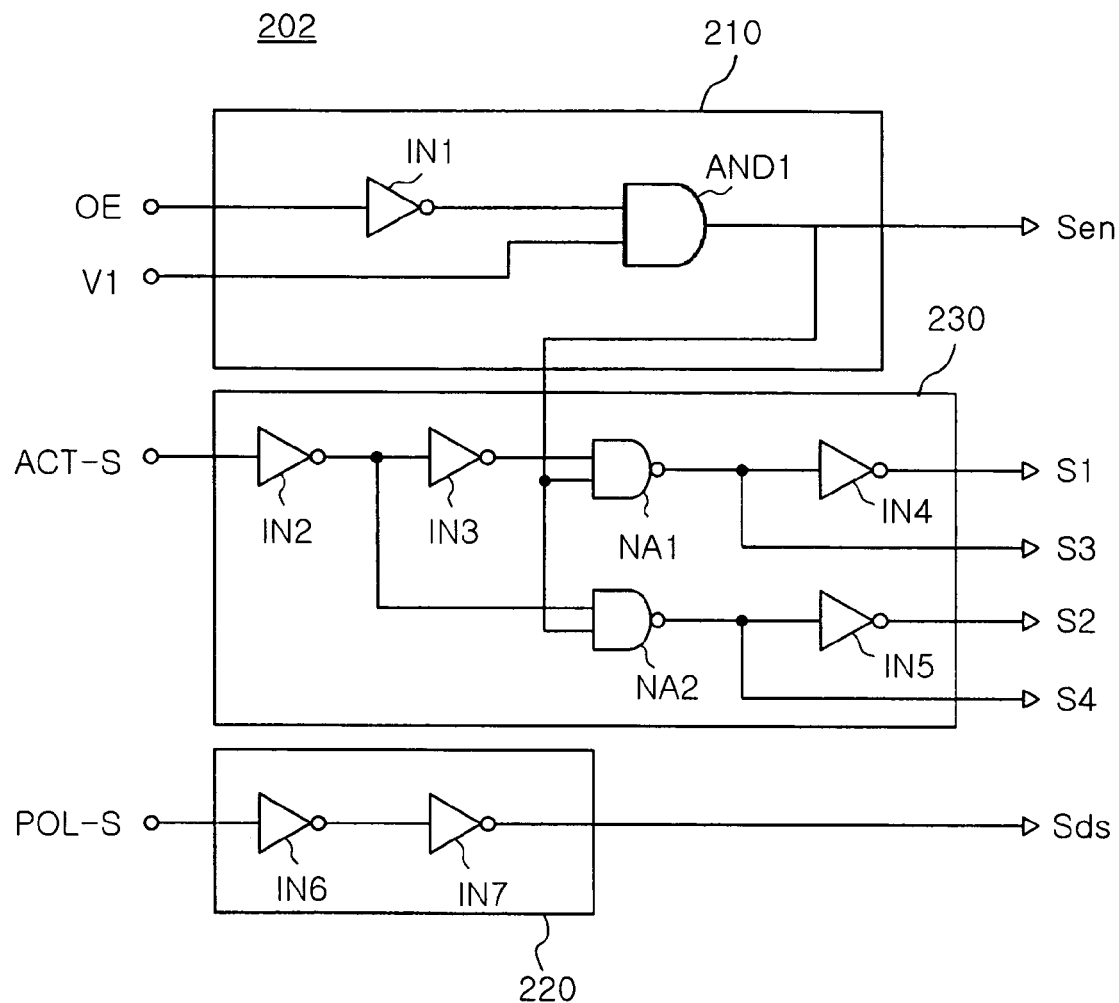
FIG. 5 is a circuit diagram of a drive controller in FIG. 4.

FIG. 5 is a circuit diagram of the drive controller 202 in FIG. 4.

With reference to FIG. 5, the drive controller 202 includes an operation controller 210 for outputting an operation enable signal Sen to the drive signal generator 400 in response to the operation ON select signal OE and the operating voltage V1 from the power supply 100, a buffer 220 for outputting a forward/backward select signal Sds to the drive signal generator 400 in response to the forward/backward driving select signal POL-S, and a switching controller 230 for supplying switching signals S1–S4 to the piezoelectric actuator selector 500 in response to the piezoelectric actuator select signal ACT-S and the operation enable signal Sen from the operation controller 210 to select one of the first and second piezoelectric actuators ACT1 and ACT2.

A detailed description will hereinafter be given of the power supply 100, clock generator 300 and drive signal generator 400 which are applied in common to the first and second embodiments of the present invention.

Figure 6:
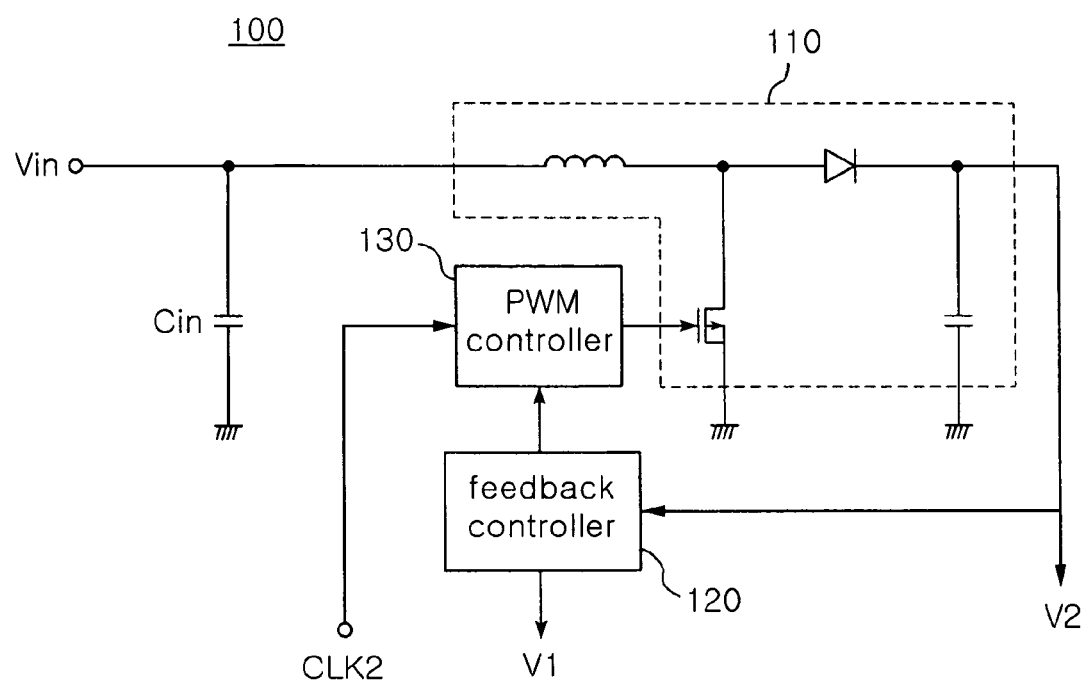
FIG. 6 is a circuit diagram of a power supply according to the present invention.

FIG. 6 is a circuit diagram of the power supply 100 according to the present invention.

With reference to FIG. 6, the power supply 100 includes a boost circuit 110 for boosting an input voltage Vin received through an input capacitor Cin to a predetermined level in response to a pulse width modulation (PWM) signal to output the operating voltage V2, a feedback controller 120 for detecting the output voltage from the boost circuit 110 to output a feedback voltage as the operating voltage V1, and a PWM controller 130 for controlling the duty ratio of a second clock signal CLK2 from the clock generator 300 according to the feedback voltage from the feedback controller 120 to provide the PWM signal to the boost circuit 110.

Figure 7:
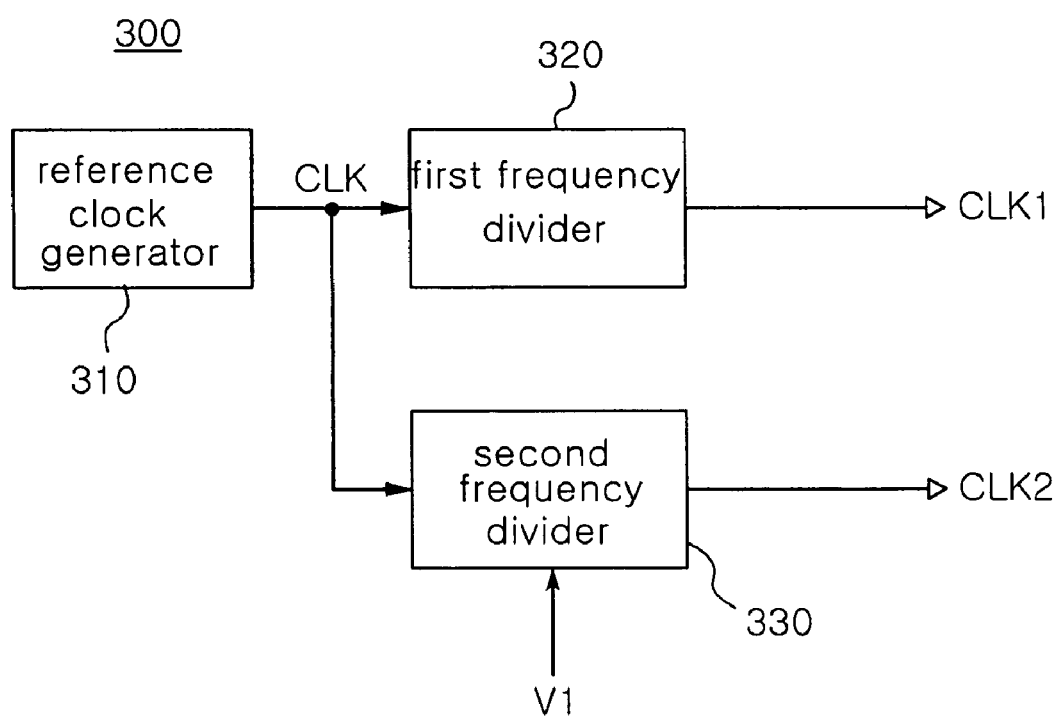
FIG. 7 is a block diagram of a clock generator according to the present invention.

FIG. 7 is a block diagram of the clock generator 300 according to the present invention.

With reference to FIG. 7, the clock generator 300 includes a reference clock generator 310 for generating a reference clock signal CLK, a first frequency divider 320 for dividing the frequency of the reference clock signal CLK in a first predetermined ratio to provide the first clock signal CLK1 to the drive signal generator 400, and a second frequency divider 330 for dividing the frequency of the reference clock signal CLK in a second predetermined ratio to generate two clock signals CLK21 and CLK22 having different duty ratios, and providing one of the generated clock signals CLK21 and CLK22 as the second clock signal CLK2 to the power supply 100 according to the level of the operating voltage V1 from the power supply 100.

Figure 8:
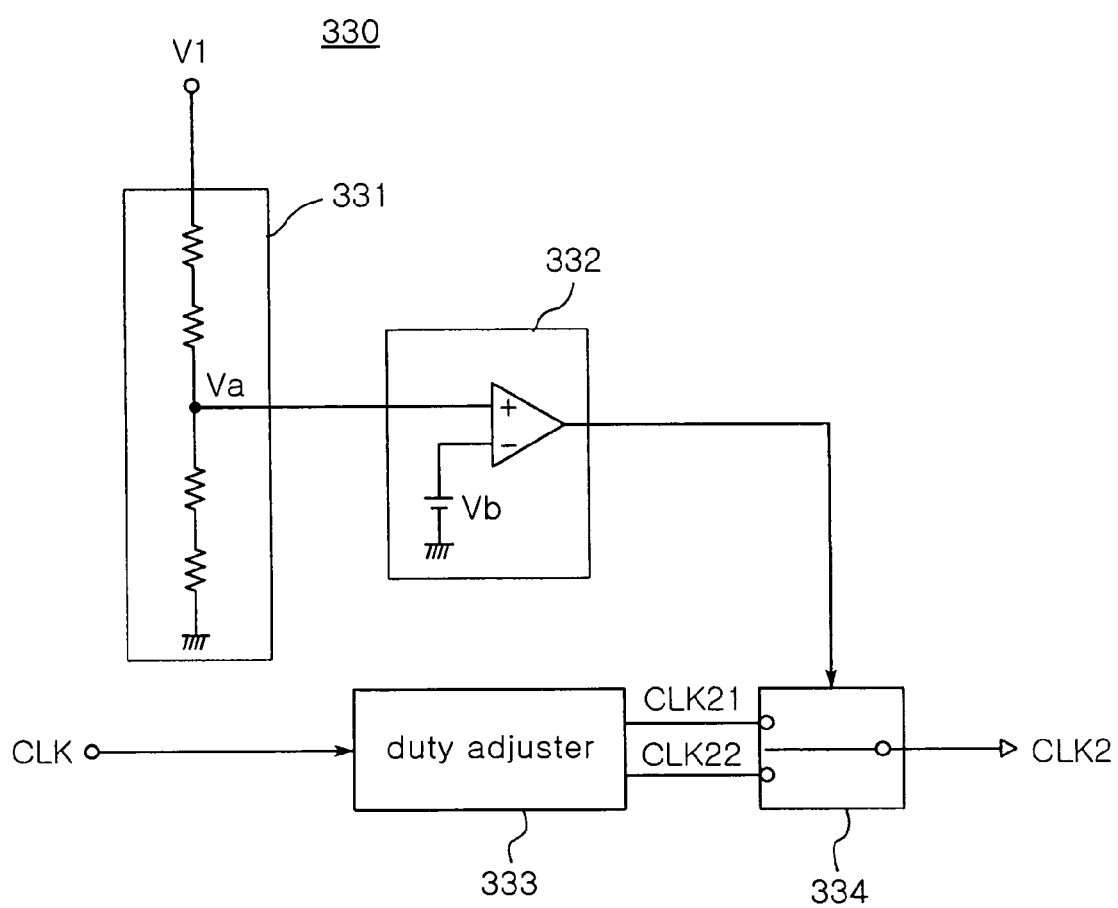
FIG. 8 is a circuit diagram of a second frequency divider in FIG. 7.

FIG. 8 is a circuit diagram of the second frequency divider 330 in FIG. 7.

With reference to FIG. 8, the second frequency divider 330 includes a voltage divider 331 for dividing the operating voltage V1 from the power supply 100 to detect a desired voltage Va, a comparator 332 for comparing the voltage Va detected by the voltage divider 331 with a predetermined reference voltage Vb and outputting a switching signal based on a result of the comparison, a duty adjuster 333 for dividing the frequency of the reference clock signal CLK in the second predetermined ratio to generate the two clock signals CLK21 and CLK22 with different duty ratios, and a switch 334 for selecting one of the two clock signals CLK21 and CLK22 from the duty adjuster 333 in response to the switching signal from the comparator 332 and outputting the selected clock signal as the second clock signal CLK2 to the power supply 100.

Figure 9:
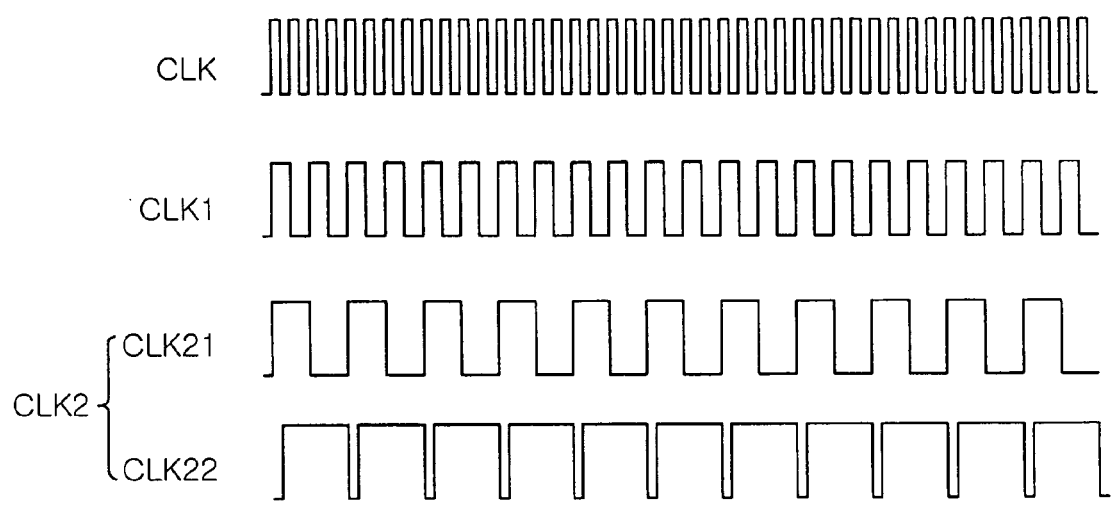
FIG. 9 is a timing diagram of main signals in the clock generator according to the present invention.

FIG. 9 is a timing diagram of main signals in the clock generator 300 according to the present invention.

In FIG. 9, CLK, CLK1 and CLK2 denote the reference clock signal, first clock signal and second clock signal generated in the clock generator 300, respectively, and CLK21 and CLK22 denote the clock signals with different duty ratios, one of which is selected as the second clock signal.

Figure 10:
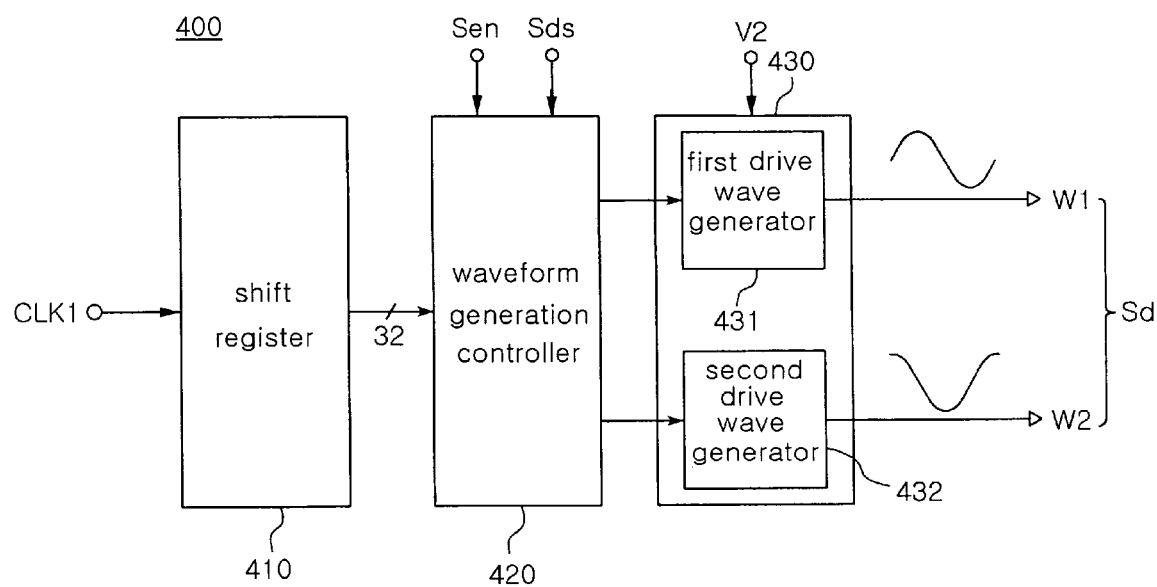
FIG. 10 is a block diagram of a drive signal generator according to the present invention.

FIG. 10 is a block diagram of the drive signal generator 400 according to the present invention.

With reference to FIG. 10, the drive signal generator 400 includes a shift register 410 which is implemented with n flip-flops forming a ring structure. The flip-flops act to sequentially output high signals in response to the first clock signal CLK1 from the clock generator 300. The drive signal generator 400 further includes a waveform generation controller 420 for controlling the generation of the forward or backward drive signal Sd using the sequential high signals from the shift register 410 in response to the forward/backward select signal Sds from the drive controller 201 or 202 while the operation enable signal Sen from the drive controller 201 or 202 is inputted, and a drive waveform generator 430 for generating the forward or backward drive signal Sd using the operating voltage V2 from the power supply 100 under the control of the waveform generation controller 420. Here, the forward or backward drive signal Sd generated by the drive waveform generator 430 is formed of first and second drive waves W1 and W2 having a phase difference of about 90° therebetween.

Also, the drive waveform generator 430 includes, as shown in FIG. 10, a first drive wave generator 431 for generating the first drive waves W1 and a second drive wave generator 432 for generating the second drive waves.

For example, assuming that the drive signal is set as the forward drive signal when the first drive wave W1 and the second drive wave W2 are a sine wave and a cosine wave, respectively, it can be set as the backward drive signal when the first drive wave W1 and the second drive wave W2 are a cosine wave and a sine wave, respectively. The contrary concept may, of course, be established.

The piezoelectric actuator selector 500 is adapted to select one of the first and second piezoelectric actuators ACT1 and ACT2 in response to the switching signals S1–S4 from the drive controller 202 and supply the forward or backward drive signal Sd from the drive signal generator 400 to the selected piezoelectric actuator.

For example, when the drive signal is the forward drive signal where the first drive wave W1 and the second drive wave W2 are a sine wave and a cosine wave, respectively, the piezoelectric actuator selector 500 selects both terminals of the first piezoelectric actuator ACT1 and supplies the sine wave, or first drive wave W1, to one terminal of the actuator ACT1 and the cosine wave, or second drive wave W2, to the other terminal of the actuator ACT1, respectively, so that the actuator ACT1 can be forward driven.

Figure 11:
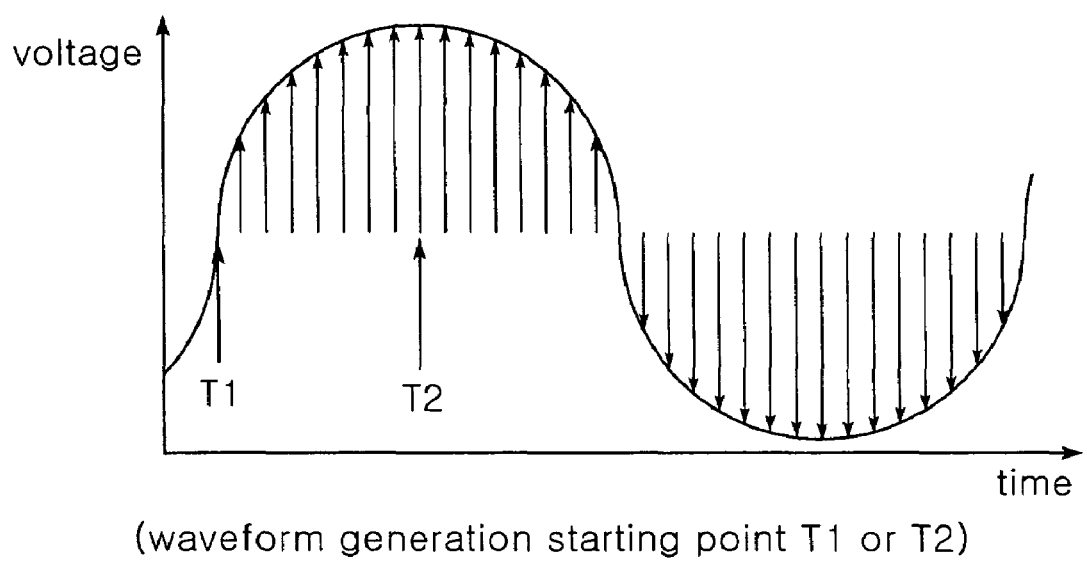
FIG. 11 is a waveform diagram illustrating the principle of waveform generation in the drive signal generator according to the present invention.

FIG. 11 is a waveform diagram illustrating the principle of waveform generation in the drive signal generator 400 according to the present invention.

As shown in FIG. 11, the drive signal generator 400 sequentially generates a plurality of voltages (e.g., 32 voltages) corresponding to a drive wave of one period using the operating voltage V2 from the power supply 100. At this time, a sine wave or cosine wave can be generated by starting the generation of the drive wave at a phase of 0° or 90°. As a result, the first drive wave W1 can be generated as a sine wave and the second drive wave W2 can be generated as a cosine wave, or vice versa.

Figure 12:
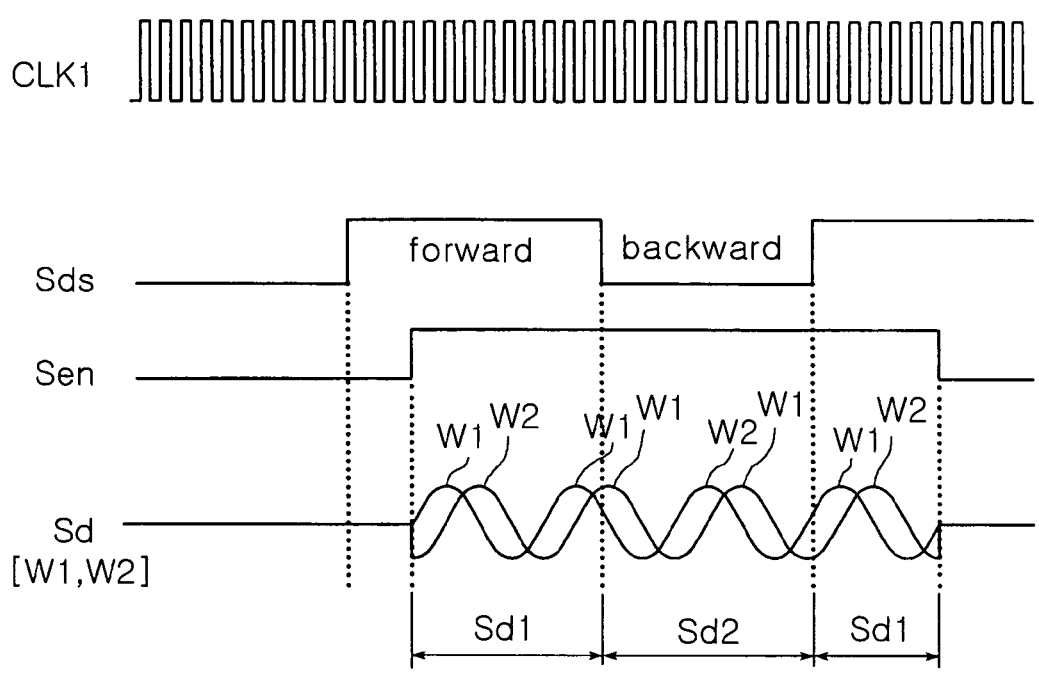
FIG. 12 is a timing diagram of main signals in the drive signal generator according to the present invention.

FIG. 12 is a timing diagram of main signals in the drive signal generator 400 according to the present invention.

In FIG. 12, CLK1 denotes the first clock signal generated in the clock generator 300, Sds denotes the forward/backward select signal, Sen denotes the operation enable signal, and Sd denotes the piezoelectric actuator forward/backward drive signal which, as shown, includes Sd1 and Sd2, wherein Sd1 denotes the piezoelectric actuator forward drive signal, and Sd2 denotes the piezoelectric actuator backward drive signal.

Next, a detailed description will be given of the operation of the piezoelectric actuator drive system according to the present invention.

According to the present invention, the piezoelectric actuator drive system can forward or backward drive one piezoelectric actuator which is applied to a camera module of a mobile phone or the like for zooming and/or focusing therein, or a selected one of two such piezoelectric actuators, as will hereinafter be described in detail.

First, with reference to FIGS. 2 and 3, in the first embodiment of the present invention, the power supply 100 converts the input voltage Vin into the operating voltages V1 and V2 and supplies the operating voltage V1 to the drive controller 201 and the operation voltage V2 to the drive signal generator 400, respectively.

Then, the drive controller 201 controls the generation of the forward/backward drive signal Sd for the piezoelectric actuator ACT in response to the operation ON select signal OE and the forward/backward driving select signal POL-S.

The clock generator 300 generates the first clock signal CLK1 in response to the operating voltage V1 from the power supply 100 and outputs it to the drive signal generator 400.

That is, in the present embodiment, upon receiving the operating voltage V1 from the power supply 100, the clock generator 300 generates the reference clock signal CLK, divides the frequency thereof to generate the first and second clock signals CLK1 and CLK2 with different frequencies, and outputs the first clock signal CLK1 to the drive signal generator 400 and the second clock signal CLK2 to the power supply 100, respectively.

The drive signal generator 400 generates the forward or backward drive signal Sd and supplies to the piezoelectric actuator ACT under the forward/backward drive signal generation control of the drive controller 201. As a result, the piezoelectric actuator ACT is driven forward or backward.

Here, assuming that the drive signal is set as the forward drive signal when the first drive wave W1 and the second drive wave W2 are a sine wave and a cosine wave, respectively, it can be set as the backward drive signal when the first drive wave W1 and the second drive wave W2 are a cosine wave and a sine wave, respectively. The contrary concept may, of course, be established. This drive signal setting can also be applied to the second embodiment of the present invention.

Next, with reference to FIGS. 4 and 5, in the second embodiment of the present invention, the power supply 100 converts the input voltage Vin into the operating voltages V1 and V2 and supplies the operating voltage V1 to the drive controller 202 and the operation voltage V2 to the drive signal generator 400, respectively.

Then, the drive controller 202 controls the selection of one of the first and second piezoelectric actuators ACT1 and ACT2 and the generation of the forward/backward drive signal Sd for the selected piezoelectric actuator in response to the operation ON select signal OE, the piezoelectric actuator select signal ACT-S and the forward/backward driving select signal POL-S.

The clock generator 300 generates the first clock signal CLK1 in response to the operating voltage V1 from the power supply 100 and outputs it to the drive signal generator 400.

That is, in the present embodiment, upon receiving the operating voltage V1 from the power supply 100, the clock generator 300 generates the reference clock signal CLK, divides the frequency thereof to generate the first and second clock signals CLK1 and CLK2 with different frequencies, and outputs the first clock signal CLK1 to the drive signal generator 400 and the second clock signal CLK2 to the power supply 100, respectively.

The drive signal generator 400 generates the forward or backward drive signal Sd under the forward/backward drive signal generation control of the drive controller 202. Here, assuming that the drive signal is set as the forward drive signal when the first drive wave W1 and the second drive wave W2 are a sine wave and a cosine wave, respectively, it can be set as the backward drive signal when the first drive wave W1 and the second drive wave W2 are a cosine wave and a sine wave, respectively. The contrary concept may, of course, be established.

Then, the piezoelectric actuator selector 500 selects one of the first and second piezoelectric actuators ACT1 and ACT2 under the piezoelectric actuator selection control of the drive controller 202 and supplies the forward or backward drive signal Sd generated by the drive signal generator 400 to the selected piezoelectric actuator.

As a result, the selected piezoelectric actuator is driven forward or backward.

The first and second embodiments of the present invention will hereinafter be described in detail with reference to FIGS. 2 to 12.

First, with reference to FIG. 6, in the power supply 100, the boost circuit 110 boosts the input voltage Vin to a predetermined level in response to a PWM signal to output the operating voltage V2. The feedback controller 120 detects the output voltage from the boost circuit 110 to output a feedback voltage as the operating voltage V1. The PWM controller 130 controls the duty ratio of the second clock signal CLK2 from the clock generator 300 according to the feedback voltage from the feedback controller 120 to provide the PWM signal to the boost circuit 110. In this manner, according to the present invention, the power supply 100 can supply more stable operating voltages by performing the PWM control and feedback control.

With reference to FIGS. 3 and 5, in the drive controller 201 or 202, the operation controller 210 outputs the operation enable signal Sen to the drive signal generator 400 in response to the operation ON select signal OE and the operating voltage V1 from the power supply 100.

The operation controller 210 can perform a logic operation in the following manner. For example, when the operation ON select signal OE is active "0", it is inverted to "1" by an inverter IN1 and then ANDed with the operating voltage V1 of logic "1" by an AND gate AND1, so the operation enable signal Sen of logic "1" is outputted, as in Table 1 below.

TABLE 1

| Input | | IN1 Output | AND1 Output |
| --- | --- | --- | --- |
| OE | V1 | | |
| 0 | 0 | 1 | 0 |
| 0 | 1 | 1 | 1 |
| 1 | 0 | 0 | 0 |
| 1 | 1 | 0 | 0 |

As can be seen from the above Table 1, the operation enable signal Sen is outputted when the power supply 100 supplies the operating voltage V1 at the same time that the operation ON selection is made.

The buffer 220 outputs the forward/backward select signal Sds to the drive signal generator 400 in response to the forward/backward driving select signal POL-S. To this end, the buffer 220 includes two inverters IN6 and IN7 for buffering the forward/backward driving select signal POL-S and outputting the buffered signal as the forward/backward select signal Sds to the drive signal generator 400.

With reference to FIG. 7, in the clock generator 300, the reference clock generator 310 generates the reference clock signal CLK, and the first frequency divider 320 divides the frequency of the reference clock signal CLK in the first predetermined ratio to provide the first clock signal CLK1. The second frequency divider 330 divides the frequency of the reference clock signal CLK in the second predetermined ratio to generate the two clock signals CLK21 and CLK22 having different duty ratios, and provides one of the generated clock signals CLK21 and CLK22 as the second clock signal CLK2 according to the level of the operating voltage V1 from the power supply 100.

With reference to FIGS. 8 and 9, in the second frequency divider 330, the voltage divider 331 divides the operating voltage V1 from the power supply 100 to detect the desired voltage Va.

The comparator 332 compares the voltage Va detected by the voltage divider 331 with the predetermined reference voltage Vb and outputs a switching signal based on a result of the comparison. For example, the switching signal may be high in level if the detected voltage Va is higher than the reference voltage Vb, and low in level, otherwise.

The duty adjuster 333 divides the frequency of the reference clock signal CLK in the second predetermined ratio to generate the two clock signals CLK21 and CLK22 with different duty ratios. For example, the clock signal CLK21 may be generated to have a duty ratio of 50% and the clock signal CLK22 may be generated to have a duty ratio of 80%.

The switch 334 selects one of the two clock signals CLK21 and CLK22 from the duty adjuster 333 in response to the switching signal from the comparator 332 and outputs the selected clock signal to the power supply 100. As a result, the second frequency divider 330 supplies a desired clock signal for the PWM control according to the level of the operating voltage V1 from the power supply 100. That is, the second frequency divider 330 supplies a clock signal with a lower duty ratio when the operating voltage V1 is lower than the reference voltage, and a clock signal with a higher duty ratio when the operating voltage V1 is higher than the reference voltage. This enables the power supply 100 to be stably operated.

With reference to FIGS. 10 and 11, in the drive signal generator 400, the shift register 410 is implemented with n flip-flops forming a ring structure. The flip-flops sequentially output high signals in response to the first clock signal CLK1 from the clock generator 300.

The waveform generation controller 420 controls the generation of the forward or backward drive signal Sd using the sequential high signals from the shift register 410 in response to the forward/backward select signal Sds from the drive controller 201 or 202 while the operation enable signal Sen from the drive controller 201 or 202 is inputted.

The drive waveform generator 430 generates the forward or backward drive signal Sd using the operating voltage V2 from the power supply 100 under the control of the waveform generation controller 420. At this time, the forward or backward drive signal Sd generated by the drive waveform generator 430 is composed of first and second drive waves W1 and W2 having a phase difference of about 90° therebetween, as shown in FIG. 12.

With reference to FIG. 11, the drive signal generator 400 sequentially generates a plurality of voltages corresponding to a drive wave of one period. At this time, a sine wave or cosine wave can be generated by controlling the starting point of generation of the drive wave.

A detailed description will hereinafter be given of the drive controller 202 of the piezoelectric actuator drive system according to the second embodiment of the present invention in conjunction with FIG. 5.

With reference to FIG. 5, the switching controller 230 of the drive controller 202 supplies switching signals S1–S4 to the piezoelectric actuator selector 500 in response to the piezoelectric actuator select signal ACT-S and the operation enable signal Sen from the operation controller 210 to select one of the first and second piezoelectric actuators ACT1 and ACT2.

The switching controller 230 of FIG. 5 can perform a logic operation in the following manner. For example, assume that the operation enable signal Sen is active "1", and the piezoelectric actuator select signal ACT-S is "1" for selection of the first piezoelectric actuator ACT1 and "0" for selection of the second piezoelectric actuator ACT2. When the piezoelectric actuator select signal ACT-S is "1", it is inputted as logic "1" to a first NAND gate NA1 sequentially through two inverters IN2 and IN3. Also, the piezoelectric actuator select signal ACT-S is inverted to "0" through one inverter IN2 and then inputted to a second NAND gate NA2. The first NAND gate NA1 NANDs the output of logic "1" of the inverter IN3 and the operation enable signal Sen of logic "1" and outputs the resulting signal of logic "0" as the switching signal S3. The output signal from the first NAND gate NA1 is also inverted to "1" through an inverter IN4 and then outputted as the switching signal S1. The second NAND gate NA2 NANDs the output of logic "0" of the inverter IN2 and the operation enable signal Sen of logic "1" and outputs the resulting signal of logic "1" as the switching signal S4. The output signal from the second NAND gate NA2 is also inverted to "0" through an inverter IN5 and then outputted as the switching signal S2.

In this case, the first drive wave W1 is supplied to one terminal of the first actuator ACT1 by the switching signal S1, and the second drive wave W2 is supplied to the other terminal of the first actuator ACT1 by the switching signal S4.

On the other hand, when the piezoelectric actuator select signal ACT-S is "0", it is inverted to "1" through one inverter IN2 and then inputted to the second NAND gate NA2. The piezoelectric actuator select signal ACT-S is also inputted as logic "0" to the first NAND gate NA1 sequentially through two inverters IN2 and IN3. The first NAND gate NA1 NANDs the output of logic "0" of the inverter IN3 and the operation enable signal Sen of logic "1" and outputs the resulting signal of logic "1" as the switching signal S3. The output signal from the first NAND gate NA1 is also inverted to "0" through the inverter IN4 and then outputted as the switching signal S1. The second NAND gate NA2 NANDs the output of logic "1" of the inverter IN2 and the operation enable signal Sen of logic "1" and outputs the resulting signal of logic "0" as the switching signal S4. The output signal from the second NAND gate NA2 is also inverted to "1" through the inverter IN5 and then outputted as the switching signal S2.

In this case, the first drive wave W1 is supplied to one terminal of the second actuator ACT2 by the switching signal S2, and the second drive wave W2 is supplied to the other terminal of the second actuator ACT2 by the switching signal S3.

In this manner, the switching controller 230 performs the logic operation to output the switching signals S1–S4 to select one of the first and second piezoelectric actuators ACT1 and ACT2, as in Table 2 below.

TABLE 2

| | | ACT1 Selected | | ACT2 Selected | | |
|---|---|---|---|---|---|---|
| Sen | ACT-S | S1 | S4 | S2 | S3 | Selected |
| 0 | 0 | 0 | 1 | 0 | 1 | Not Selected |
| 0 | 1 | 0 | 1 | 0 | 1 | Not Selected |
| 1 | 0 | 0 | 0 | 1 | 1 | ACT2 Selected |
| 1 | 1 | 1 | 1 | 0 | 0 | ACT1 Selected |

As can be seen from the above Table 2, if the piezoelectric actuator select signal ACT-S is "1" under the condition that the operation enable signal Sen of logic "1" is inputted, switches SW1 and SW4 in the piezoelectric actuator selector 500 are turned on in response to the switching signals S1 and S4 to select the first actuator ACT1. On the contrary, provided that the piezoelectric actuator select signal ACT-S is "0" under the condition that the operation enable signal Sen of logic "1" is inputted, switches SW2 and SW3 in the piezoelectric actuator selector 500 are turned on in response to the switching signals S2 and S3 to select the second actuator ACT2.

On the other hand, where the operation enable signal Sen is "0", neither of the first and second actuators ACT1 and ACT2 is selected irrespective of the state of the piezoelectric actuator select signal ACT-S.

The piezoelectric actuator selector 500 selects one of the first and second piezoelectric actuators ACT1 and ACT2 in response to the switching signals S1–S4 from the drive controller 202 and supplies the forward or backward drive signal Sd from the drive signal generator 400 to the selected piezoelectric actuator.

As described above, in the first embodiment of the present invention, the piezoelectric actuator drive system can drive a piezoelectric actuator forward or backward. In the second embodiment of the present invention, the piezoelectric actuator drive system can select one of two piezoelectric actuators and drive the selected piezoelectric actuator forward or backward.

As apparent from the above description, the present invention provides a system for driving a piezoelectric actuator which is applied to a camera module of a mobile phone or the like for focusing and/or zooming therein. The piezoelectric actuator drive system is capable of driving the piezoelectric actuator forward or backward using a phase shift of two drive waves forming a drive signal. The system can also selectively drive two such piezoelectric actuators. Therefore, it is possible to reduce power consumption and improve efficiency.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A piezoelectric actuator drive system comprising:
power supply means for supplying an operating voltage;
drive control means for controlling generation of a forward/backward drive signal for a piezoelectric actuator in response to an operation ON select signal and a forward/backward driving select signal;
clock generation means for generating a first clock signal in response to the operating voltage from the power supply means, the clock generation means includes:
  a reference clock generator for generating a reference clock signal,
  a first frequency divider for dividing a frequency of the reference clock signal in a first predetermined ratio to provide the first clock signal, and
  a second frequency divider for dividing the frequency of the reference clock signal in a second predetermined ratio to generate two clock signals having different duty ratios, and providing one of the generated clock signals as the second clock signal according to a level of the operating voltage from the power supply means; and
drive signal generation means for generating the forward or backward drive signal to supplying to the piezoelectric actuator in response to the first clock signal from the clock generation means and the operating voltage from the power supply means under the forward/backward drive signal generation control of the drive control means.

2. The piezoelectric actuator drive system as set forth in claim 1, wherein the drive control means includes:
an operation controller for outputting an operation enable signal to the drive signal generation means in response to the operation ON select signal and the operating voltage from the power supply means; and
a buffer for outputting a forward/backward select signal to the drive signal generation means in response to the forward/backward driving select signal.

3. The piezoelectric actuator drive system as set forth in claim 1, wherein the power supply means includes:
a boost circuit for boosting an input voltage to a predetermined voltage in response to a pulse width modulation (PWM) signal;
a feedback controller for detecting an output voltage from the boost circuit to output a feedback voltage; and
a PWM controller for controlling a duty ratio of a second clock signal from the clock generation means according to the feedback voltage from the feedback controller to provide the PWM signal to the boost circuit,
wherein the predetermined voltage or feedback voltage is supplied as the operating voltage.

4. The piezoelectric actuator drive system as set forth in claim 1, wherein the second frequency divider includes:
a voltage divider for dividing the operating voltage from the power supply means to detect a desired voltage;
a comparator for comparing the voltage detected by the voltage divider with a predetermined reference voltage and outputting a switching signal based on a result of the comparison;

a duty adjuster for dividing the frequency of the reference clock signal in the second predetermined ratio to generate the two clock signals with the different duty ratios; and a switch for selecting one of the two clock signals from the duty adjuster in response to the switching signal from the comparator and outputting the selected clock signal as the second clock signal to the power supply means.

5. The piezoelectric actuator drive system as set forth in claim 2, wherein the drive signal generation means includes:

a shift register including n flip-flops forming a ring structure, the flip-flops sequentially outputting high signals in response to the first clock signal from the clock generation means;

a waveform generation controller for controlling the generation of the forward or backward drive signal using the sequential high signals from the shift register in response to the forward/backward select signal from the drive control means while the operation enable signal from the drive control means is inputted; and a drive waveform generator for generating the forward or backward drive signal using the operating voltage from the power supply means under the control of the waveform generation controller, the forward or backward drive signal generated by the drive waveform generator including first and second drive waves having a phase difference of about 90° therebetween.

6. A piezoelectric actuator drive system comprising:

power supply means for supplying an operating voltage;

drive control means for controlling selection of one of first and second piezoelectric actuators and generation of a forward/backward drive signal for the selected piezoelectric actuator in response to an operation ON select signal, a piezoelectric actuator select signal and a forward/backward driving select signal;

clock generation means for generating a first clock signal in response to the operating voltage from the power supply means, the clock generation means includes:

a reference clock generator for generating a reference clock signal, a first frequency divider for dividing a frequency of the reference clock signal in a first predetermined ratio to provide the first clock signal, and a second frequency divider for dividing the frequency of the reference clock signal in a second predetermined ratio to generate two clock signals having different duty ratios, and providing one of the generated clock signals as the second clock signal according to a level of the operating voltage from the power supply means;

drive signal generation means for generating the forward or backward drive signal in response to the first clock signal from the clock generation means and the operating voltage from the power supply means under the forward/backward drive signal generation control of the drive control means; and a piezoelectric actuator selector for selecting one of the first and second piezoelectric actuators under the piezoelectric actuator selection control of the drive control means and supplying the forward or backward drive signal generated by the drive signal generation means to the selected piezoelectric actuator.

7. The piezoelectric actuator drive system as set forth in claim 6, wherein the drive control means includes:

an operation controller for outputting an operation enable signal to the drive signal generation means in response to the operation ON select signal and the operating voltage from the power supply means;

a buffer for outputting a forward/backward select signal to the drive signal generation means in response to the forward/backward driving select signal; and a switching controller for supplying a plurality of switching signals to the piezoelectric actuator selector in response to the piezoelectric actuator select signal and the operation enable signal from the operation controller to select one of the first and second piezoelectric actuators.

8. The piezoelectric actuator drive system as set forth in claim 6, wherein the power supply means includes:

a boost circuit for boosting an input voltage to a predetermined voltage in response to a PWM signal;

a feedback controller for detecting an output voltage from the boost circuit to output a feedback voltage; and a PWM controller for controlling a duty ratio of a second clock signal from the clock generation means according to the feedback voltage from the feedback controller to provide the PWM signal to the boost circuit, wherein the predetermined voltage or feedback voltage is supplied as the operating voltage.

9. The piezoelectric actuator drive system as set forth in claim 6, wherein the second frequency divider includes:

a voltage divider for dividing the operating voltage from the power supply means to detect a desired voltage;

a comparator for comparing the voltage detected by the voltage divider with a predetermined reference voltage and outputting a switching signal based on a result of the comparison;

a duty adjuster for dividing the frequency of the reference clock signal in the second predetermined ratio to generate the two clock signals with the different duty ratios; and a switch for selecting one of the two clock signals from the duty adjuster in response to the switching signal from the comparator and outputting the selected clock signal as the second clock signal to the power supply means.

10. The piezoelectric actuator drive system as set forth in claim 7, wherein the drive signal generation means includes:

a shift register including n flip-flops forming a ring structure, the flip-flops sequentially outputting high signals in response to the first clock signal from the clock generation means;

a waveform generation controller for controlling the generation of the forward or backward drive signal using the sequential high signals from the shift register in response to the forward/backward select signal from the drive control means while the operation enable signal from the drive control means is inputted; and a drive waveform generator for generating the forward or backward drive signal using the operating voltage from the power supply means under the control of the waveform generation controller, the forward or backward drive signal generated by the drive waveform generator including first and second drive waves having a phase difference of about 90° therebetween.

11. The piezoelectric actuator drive system as set forth in claim 7, wherein the piezoelectric actuator selector is adapted to select one of the first and second piezoelectric actuators in response to the switching signals from the drive control means and supply the forward or backward drive signal generated by the drive signal generation means to the selected piezoelectric actuator.

* * * * *